P. A. MERTEN.
UNIVERSAL JOINT.
APPLICATION FILED APR. 20, 1910.
999,831.
Patented Aug. 8, 1911.
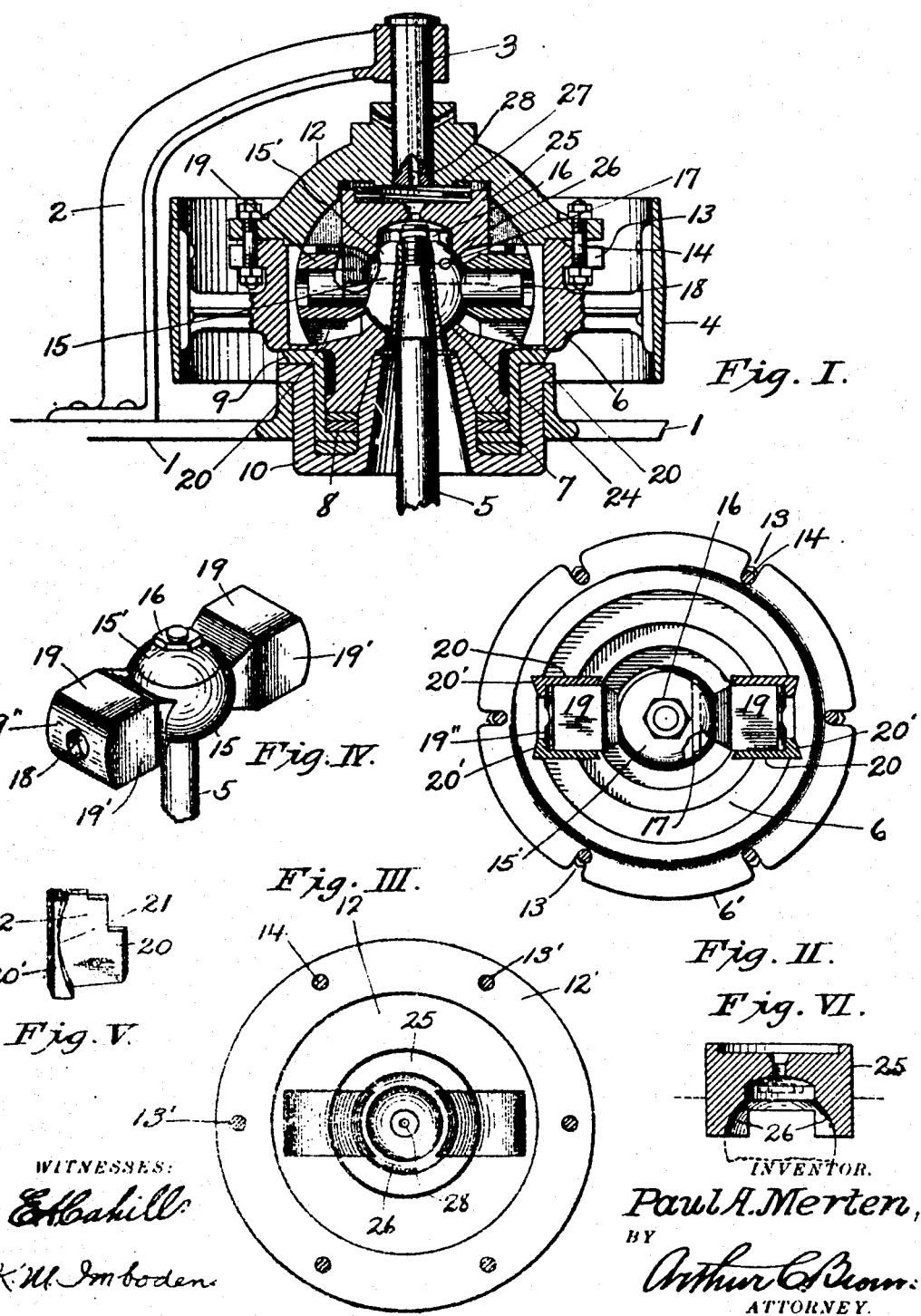
WITNESSES:
E. H. Cahill
K. M. Imboden
INVENTOR.
Paul A. Merten,
BY
Arthur C. Brown
ATTORNEY.

UNITED STATES PATENT OFFICE.

PAUL AUGUST MERTEN, OF WESTCLIFFE, COLORADO.

UNIVERSAL JOINT.

999,831. Specification of Letters Patent. Patented Aug. 8, 1911.

Application filed April 20, 1910. Serial No. 556,527.

*To all whom it may concern:*

Be it known that I, PAUL A. MERTEN, a citizen of the United States, residing at Westcliffe, in the county of Custer and State of Colorado, have invented certain new and useful Improvements in Universal Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in universal joints and particularly to a device of this character for use in grinding mills, which embody a vertically suspended, gyratory roll-shaft.

The object of the present invention is, briefly, to provide a universal joint that shall be largely free of certain faults attending the operation of such mechanisms in present use. Among such faults are, rapid wearing out of certain parts, and frequent breakage of certain bolts, the renewal of which part renders the mill idle for considerable time, besides requiring much labor for making the repairs. In accomplishing this object I have provided the improved details of construction hereinafter described, and illustrated in the accompanying drawings, in which:

Figure I is a central vertical section, partly in elevation, of a universal joint constructed according to my invention, the roll shaft being broken away. Fig. II is a top plan view of certain parts shown in Fig. I. Fig. III is a bottom plan view of certain other parts shown in Fig. I. Fig. IV is a perspective view of a transmitting member, assembled. Fig. V is a perspective view of one of the gib plates, detached. Fig. VI is a detached sectional view of the pressure ring, taken on a plane at a right angle to that in Fig. I Referring more in detail to the parts: 1 designates a part of the rigid frame of the universal joint; 2, a bracket secured thereto and supporting a vertical stub-shaft 3; 4, the driven pulley which receives motion from a belt (not shown); and 5 the upper portion of the roll-carrying shaft. The pulley 4 is integral with an enlarged hub portion 6, within which is a large recess for the reception of a transmitting member (Fig. IV), secured on shaft 5 as presently described. Said hub portion 6 is integral with a downward extension 7, which is supported by rings 8 and by annular members 9, 10, supported by the frame 1. The construction last mentioned is not claimed as novel, therefore does not require specific description.

Bolted upon the member 6, is a cap member 12, the central part of which is journaled on the shaft 3. The manner in which said cap is attached to the member 6 is one of the features of this invention. In some structures in present use, the cap member 12 is held in place by stud-bolts, tapped into the underlying member 6. These stud-bolts frequently break or shear at or near the joint between the parts united. The machine in such cases must be stopped, the cap removed, the embedded parts of the bolts drilled out, the holes re-tapped, and new bolts inserted. By my improved construction, should the bolts be broken by excessive stress, they may be renewed in a few minutes, and without disturbing any part of the mechanism. To this end the members 6 and 12 are formed with annular flanges 6' and 12' respectively, and said flanges are formed with equally spaced, registering notches 13 and apertures 13' adapted to receive bolts 14. Preferably these bolts are threaded on both ends, and two nuts are placed on each end, as shown, the outer nuts being lock-nuts. Ordinary headed bolts may be used, however.

Mounted tightly upon the tapered end of the roll-shaft 5, is a ball 15, preferably made in two sections 15 and 15' divided on a horizontal plane, above the center thereof. The top member 15' is threaded on the threaded end of the shaft 5 and has a nut 15, formed integral with its upper portion to which a wrench may be applied when the parts are being assembled. When down against the lower member 15 this upper member is held against turning by a key-pin 17. Integral with the lower member 15 are two oppositely projected trunnions, 18. Mounted rockably on said trunnions are gib blocks 19, having parallel vertical sides 19' and convex ends 19''. The inner faces of said blocks are concaved to fit the surface of the ball 15, as shown in Fig. IV.

The hub member 6 is chambered out to receive said gib blocks, whereby the rotation of the pulley is transmitted to the trunnions and thence to the roll shaft 5. The recesses for said gib blocks are cut of greater width than that of the blocks, to provide spaces for gib-plates 20, which are shown in section in Fig. II. For holding these plates in position, the recesses are provided with dovetail grooves, and the gib-plates are shaped to fit into said grooves. All the gib plates, four in number, are set in the hub member 6, and extend up to the dividing line between that member and the cap 12. The outer end of each gib plate is formed with a flange 20', having a straight outer surface and a curved, concave inner surface 21, which fits upon the convex surface 19" of the contacting gib-block 19. The flat inner face 22 of the gib plates contacts the lateral face 19' of the gib block. All of said co-engaging faces of the plates and blocks are to be machine finished and case hardened, in order to resist the heavy wear to which these surfaces will be subjected. When the parts have worn sufficiently to create looseness therebetween, the gib plates may be removed and new ones substituted. In certain similar mechanisms in present use, comprising parts like 19 mounted in a recessed hub, half-gibs are used; but the sides of the gib-blocks wear off, lost motion results, and when an unusually heavy shock occurs, during operation, some part is broken. The gib-plates herein shown are better balanced and wear for a much longer time than said half-gibs. The lower part of the hub member 6 is formed with an annular concave bearing surface, at 24, which supports the ball 15.

As shown, the cap member 12 is recessed below, and fitted loosely within said recess is a pressure ring 25, having an annular concave face at 26, bearing upon the part 15', and having a recess for clearance of the nut head 16. Said part 25 is also formed with a seat for a flat spiral spring 27, and with its upper surface inclined downwardly toward the central opening therein. The spring 27 is compressed between members 25 and 12. An oil hole 28 is drilled through the stub shaft 3 lengthwise. The opening through the pressure-ring 25 permits the oil to flow over the ball 15, and its trunnions, thereby lubricating all relatively moving bearing surfaces. The pressure ring extends down to approximately the center of the ball 15--15' and is formed with suitable recesses to permit the vertical oscillation of the gib blocks 19.

In operation, when the roll shaft is forced upward, the upward pressure will be yieldingly resisted by the spring 27, and violent blows of one part upon another, (which sometimes result in breakage) will be prevented.

As is well known in the art, the roll-shaft 5 will gyrate when in operation. This movement causes the trunnions 18 to oscillate, both upon their own axis and in vertical planes, which last described movement causes the faces 19' and 19" of gib-blocks 19 to slide upon the gib plates 20. The ball 15--15', being spherical, has universal movement between members 7 and 25.

Having thus described my invention, what I claim as new therein and desire to secure by Letters-Patent is:—

1. In a universal joint the combination with a shaft having a tapering end portion, having a threaded extension, of a ball made in two sections divided upon a plane passing above the center of the ball; the larger section having a tapering bore, and mounted on the tapering part of the shaft, the smaller section having a threaded hole and mounted on the threaded extension, and a key between said smaller section and said large section substantially as specified.

2. The combination of a ball divided into major and minor segments, a shaft rigidly mounted in said major segment, and having a threaded extension for carrying said minor segment, and a key between said major and minor segments substantially as specified.

3. In a universal joint, the combination of a ball divided into major and minor segments, said major segment having laterally projecting trunnions, a casing, means in said casing for universally engaging said trunnions, and a shaft rigidly mounted in said major segment, substantially as and for the purpose set forth.

4. In a universal joint, the combination with a ball divided into major and minor segments, of a casing having an annular concave seat for said major segment, and a means for universally connecting said casing to said major segment, for the purpose specified.

5. In a universal joint, the combination of a casing having a rigid annular concave seat and a yieldable annular concave seat, of a ball divided into major and minor segments, a shaft connecting said major and minor segments and adapted for projection beyond said casing, a key between said major and minor segments, and means for universally connecting said major segment to said casing, substantially as specified.

In testimony whereof I affix my signature in presence of two witnesses.

PAUL AUGUST MERTEN.

Witnesses:
J. F. EGLEY,
ARTHUR C. MERTEN.